Feb. 14, 1967   J. H. WESTENBERGER   3,303,862
ROUTING TOOL
Filed March 30, 1965

INVENTOR
JOHN H. WESTENBERGER
BY Elliott & Pastoriza
ATTORNEYS

3,303,862
ROUTING TOOL
John H. Westenberger, Paramount, Calif., assignor to Industrial Tools Inc., a corporation of California
Filed Mar. 30, 1965, Ser. No. 443,897
7 Claims. (Cl. 144—218)

This invention relates generally to machine tools and more particularly, to an improved routing tool for forming grooves, slots and the like.

Conventional routing tools comprise a one piece member terminating in an integral blade and adapted to be secured to a vertical spindle. With the blade rotating about a stationary axis, a work may be moved transverse to the axis of the blade beneath the blade to cut a groove or a slot therein. The process is similar to a conventional milling operation.

The depth of a groove formed by a routing tool, such as described above, is adjusted by positioning the vertical spindle further from or closer to a table along which the work is to be moved. Alternatively, a stable adjustment may be made to properly position the work relative to the routing blade. In the event a very shallow groove is to be cut, only the end portion of the blade is used and, as a consequence, there is a relatively long exposed portion of the blade which may be subject to flexure movements and consequent weakening of the overall routing tool. Further, once the blade has become dull or ineffective, a new tool must be purchased or alternatively the existing tool reworked or sharpened.

With the foregoing consideration in mind, it is a primary object of this invention to provide a greatly improved routing tool in which a two piece structure is provided wherein a body member is designed to temporarily secure a blade therein, so that only the cutting blade need be replaced when the same is worn out.

More particularly, it is an object of this invention to provide a two piece routing tool in which the extent of the cutting blade from the body member supporting the same is adjustable to correspond to the desired depth of a groove or slot to the end that only that portion of the blade exposed from the body member is used. As a result, maximum gripping of the blade by the body member is assured.

Another important object of this invention is to provide a novel routing tool including a removable blade which is adjustable as to its extent and wherein the blade itself includes at least two cutting edges adapted to be positioned in the body member such that only one edge is used and after this cutting edge has been used up or worn out, the blade may be reversed to render the other cutting edge effective.

Still another object is to provide a routing tool which is considerably more economical than prior art tools capable of performing equivalent functions.

Briefly, these and other objects and advantages of this invention are attained by providing a body member having one end adapted to be secured to a vertical spindle and the other end terminating in a flat face. This flat face includes an off-center non-circular opening adapted to receive a specially designed routing blade. The blade itself includes at least two cutting edges and, as a consequence of the off axis positioning of the receiving opening, only one of these cutting edges is effective for a first position of the blade within the body member to perform a routing operation. When this first cutting edge becomes dull or worn, the blade may be reversed end for end within the offset opening so as to locate the other of the cutting edges in proper position to perform the routing operation. Further, the longitudinal extent of the blade in and out of the body member may readily be adjusted so that the actual extent of the body member from the flat front face may be made to correspond to the desired depth of a groove or slot. By this arrangement, maximum grip is attained on the blade during the cutting operation, so that the possibility of flexure movements or vibrations being established are minimized.

A better understanding of the invention will be had by now referring to a preferred embodiment thereof as illustrated in the accompanying drawings, in which.

Figure 1:
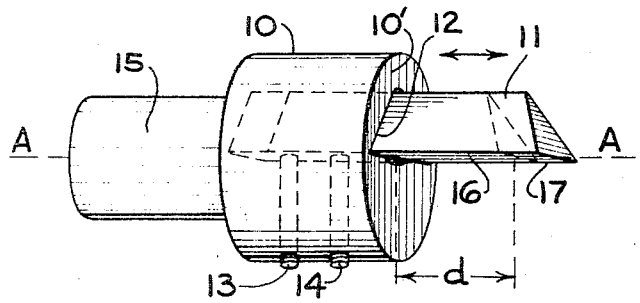
FIGURE 1 is a perspective view of one type of routing tool in accordance with the present invention.

Referring first to FIGURE 1, the routing tool comprises a body member 10 terminating at one end in a flat face 10′ arranged to receive a routing blade 11 within a non-circular opening 12. The blade is secured in position by suitable locking means in the form of set screws 13 and 14 extending laterally into the body 10. The other end of the body member 10 terminates in a shaft portion 15 adapted to be secured within a vertical spindle to rotate the body member about an axis A—A.

Figure 2:
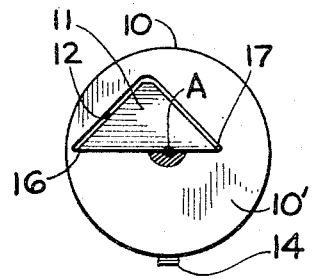
FIGURE 2 is a front elevational view of the tool illustrated in FIGURE 1.

As shown best in both FIGURES 1 and 2, the blade 11 is of a cross-section defined by a right isosceles triangle wherein the equal angle apices of the triangle define first and second cutting edges 16 and 17. The non-circular opening 12 is triangular in shape to correspond to the triangular cross-sectional shape of the blade, the set screws 13 and 14 engaging the flat side of the blade 11 between the cutting edges 16 and 17. As indicated by the dotted line in FIGURE 1, the extent of the blade 11 from the flat face 10′ may be adjusted by longitudinally positioning the blade 11 within the opening in a desired position prior to securing the blade with the set screws 13 and 14.

Figure 3:
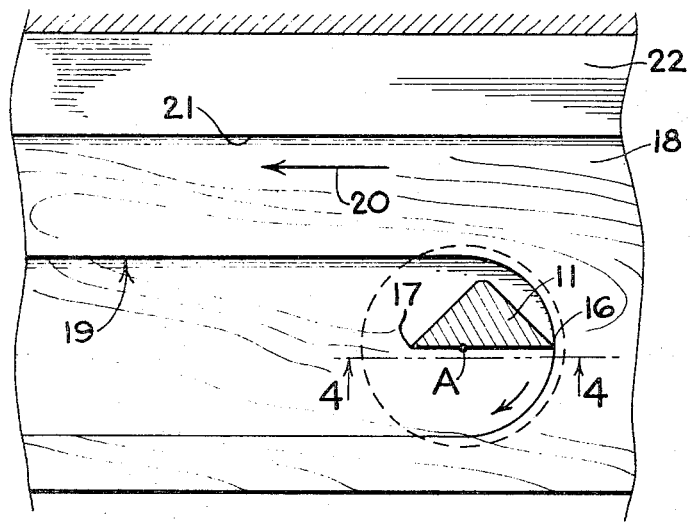
FIGURE 3 is a top plan view partly in cross-section illustrating a work in which a groove is being cut by the tool of this invention.
Figure 4:
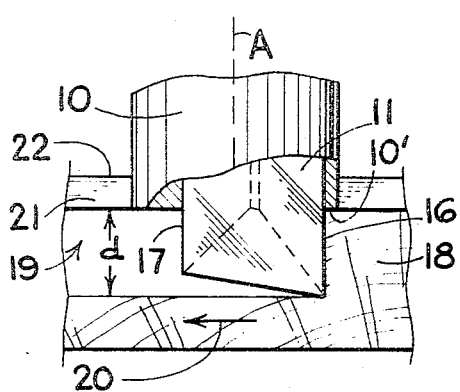
FIGURE 4 is a fragmentary cross-section taken generally in the direction of the arrows 4—4 of FIGURE 3; and, FIGURE 5 is a plan view of one preferred form of routing blade in accordance with this invention.

With reference now to FIGURES 3 and 4, the manner in which the routing tool operates will become evident. Assuming it is desired to cut a groove or slot to a depth $d$, the blade 11 of FIGURE 1 is retracted within the body member 10 to the dotted line position so that the extent of the blade from the front of the body member corresponds to the dimension $d$.

A work such as a piece of wood 18 within which a groove 19 is to be cut is then positioned beneath the vertical spindle and the wood itself moved in a direction such as indicated by the arrow 20 as the blade 11 is caused to rotate. In order to properly guide the movement of the work, there is provided a guiding edge 21 defined by a fixed guide 22.

As will be evident from FIGURES 3 and 4, the groove 19 will be cut to a depth $d$, the front face 10′ of the body member 10 limiting the depth of the groove to this desired dimension. Further, as will be clear from FIGURES 3 and 4, the cutting edge 16 of the blade 11 only is used in cutting the groove. The effectiveness of only the cutting edge 16 results from the off-center positioning of the blade 11 with respect to the axis A, as will be clear from the drawings.

If the cutting edge 16 becomes dull or worn, it is a simple matter to reverse the blade 11 end for end by loosening the set screws 13 and 14, removing the blade, and re-inserting it such that the cutting edge 17 assumes the position formerly occupied by the cutting edge 16.

As a consequence of providing a cross-section in the shape of an isosceles triangle, there can be no ambiguity in attempting to re-insert the blade 11 once it has been removed from the blade receiving opening 12. In other words, if the blade is reversed end for end, the cutting edge 17 must assume the former position of the cutting edge 16, and visa versa.

Figure 5:
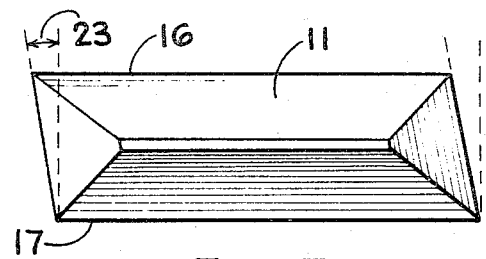

Referring to FIGURE 5, other details of the blade 11 are illustrated. Thus, it will be noted that when viewed in plan, the ends of the blade are slightly angulated as indicated at 23. Further, the end faces themselves are beveled to lie in planes which converge out of the plane of the paper as viewed in FIGURE 5. By this arrangement, a sharp point will initially be presented to the work so that a hole or bore may be provided prior to commencing lateral movement of the work beneath the routing tool to form the groove.

While the cross-section of the blade 11 has been described as defined by a right isosceles triangle, it will be evident that the apex of the non-cutting edge of the triangular shaped need not be a right angle. On the other hand, it is important that the triangular opening not be equilateral as otherwise ambiguities could exist when the blade is inserted. It is possible, however, that if all three apices of the triangular cross-section are to constitute cutting edges, an equilateral triangular opening could be provided.

If it is desired to vary the depth of the slot, the degree of extent of the blade 11 from the flat front face 10′ may be adjusted as described heretofore.

After the blade has been worn out with respect to all cutting edges, a new blade may be inserted in the body member 10. These new blades may be provided for a considerable savings in cost as compared to providing a complete new routing tool. Thus, considerable economies are effected as a consequence of the present invention.

From the foregoing description, it will be evident that the present invention has provided a greatly improved routing tool. By the provision of a separable, adjustable disposable dual edge cutting blade eccentrically mounted with respect to the axis of rotation, the various objects set forth heretofore are readily realized.

While only one specific embodiment of the invention has been set forth and described herein, it should be evident to those skilled in the art that various modifications and changes that fall within the scope and spirit of the invention can be carried out. The routing tool is therefore not to be thought of as limited to the one specific structure set forth merely for illustrative purposes.

What is claimed is:

1. A routing tool comprising, in combination: a body member adapted to be secured to a spindle for rotation about a given axis; and a router blade receivable in an off-axis position in said body member, said blade having at least two cutting edges only one of which is effective when said blade is in a first position in said body member, reversal of said blade to a second position in said body member rendering the other of said cutting edges effective.

2. A routing tool including: a router blade of cross-section defined by an isosceles triangle, the two apices of equal angles of said triangle serving as cutting edges, whereby said blade may be secured in an off-axis position to a spindle to render one of said cutting edges effective in a routing operation and then reversed end for end to render the other of said edges effective in a routing operation.

3. A routing tool comprising, in combination: a body member adapted to be secured to a spindle for rotation about a given axis; and a router blade having at least two longitudinal cutting edges receivable in said body member in an off-axis position such that only one of said cutting edges is effective to perform a routing operation, reversing of said blade end for end in said body member positioning the other of said cutting edges to perform a routing operation.

4. A tool according to claim 3, in which said body member includes a flat face normal to said axis having an opening for receiving said blade; and locking means for securing said blade in said opening, the extent of said blade from said face being adjustable.

5. A routing tool comprising, in combination: a body member terminating at one end in a flat face having an off-center blade receiving opening therein, the other end of said body member being adapted to be secured to a vertical spindle for rotating said body member about an axis normal to said flat face; a router blade having at least two longitudinally extending cutting edges receivable in said opening; and locking means for temporarily securing said blade in said opening with one end extending beyond said flat face a given distance determined by the longitudinal positioning of said blade in said opening prior to securing said locking means, one of said cutting edges being spaced further from said axis of rotation than the other cutting edge as a consequence of said off-center positioning of said blade receiving opening whereby only said one cutting edge is effective to perform a routing operation, removal of said blade and reversing of its position end for end in said opening placing said other cutting edge in position for performing a routing operation.

6. A tool according to claim 5, in which said blade receiving opening is triangular in shape and said router blade is triangular in cross-section; said locking means including at least one set screw extending laterally into said body member to engage a flat side of said blade.

7. A tool according to claim 6, in which the triangular shape of said opening is defined by a right isosceles triangle.

References Cited by the Examiner

UNITED STATES PATENTS

| 1,359,765 | 11/1920 | Stelmach | 144—240 |
| 1,789,793 | 1/1931 | Webhorn | 29—103 |
| 2,529,157 | 11/1950 | Higerd. | |
| 3,125,799 | 3/1964 | Bennett. | |

WILLIAM W. DYER, Jr., *Primary Examiner.*

W. D. BRAY, *Assistant Examiner.*